May 29, 1956 F. MARKERT ET AL 2,747,967
CATALYTIC METHOD FOR CONVERTING CARBON MONOXIDE AND
STEAM INTO CARBON DIOXIDE AND HYDROGEN
Filed Jan. 15, 1953 4 Sheets-Sheet 1

INVENTORS:
FERDINAND MARKERT
LUDWIG RAICHLE
BY *Spencer, Johnston, Cook & Root*
ATT'YS May 29, 1956 F. MARKERT ET AL 2,747,967
CATALYTIC METHOD FOR CONVERTING CARBON MONOXIDE AND
STEAM INTO CARBON DIOXIDE AND HYDROGEN
Filed Jan. 15, 1953 4 Sheets-Sheet 3

INVENTORS:
FERDINAND MARKERT
LUDWIG RAICHLE

BY Spencer, Johnston, Cook
& Root
ATT'YS

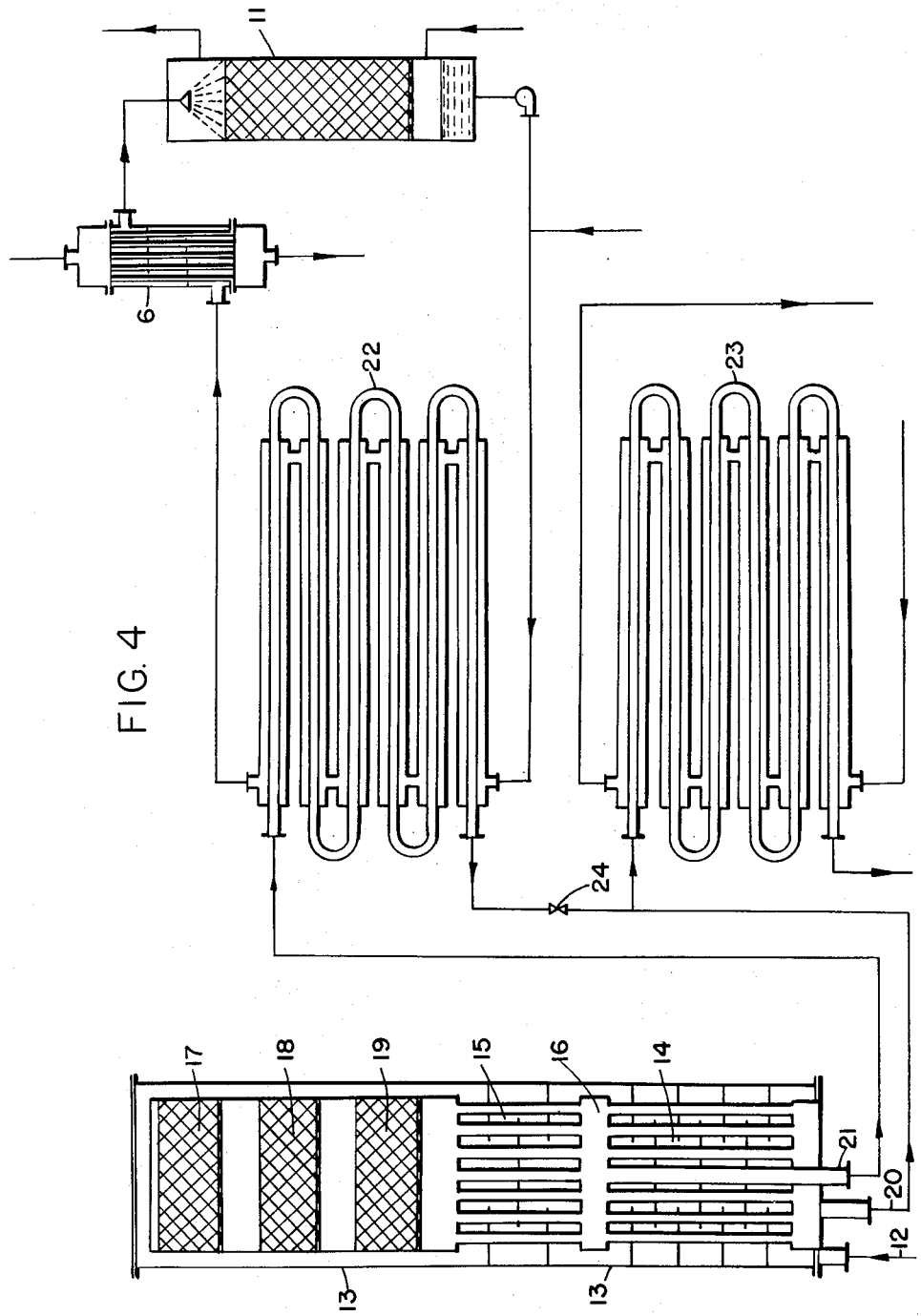

United States Patent Office 2,747,967
Patented May 29, 1956

2,747,967

CATALYTIC METHOD FOR CONVERTING CARBON MONOXIDE AND STEAM INTO CARBON DIOXIDE AND HYDROGEN

Ferdinand Markert and Ludwig Raichle, Ludwigshafen (Rhine), Germany, assignors to Badische Anilin- & Soda-Fabrik Aktiengesellschaft, Ludwigshafen am Rhine, Germany Application January 15, 1953, Serial No. 331,399

Claims priority, application Germany January 15, 1952

5 Claims. (Cl. 23—150)

This invention relates to a new and improved method for the operation of a conversion plant and to means for use in the said operation.

In the conversion of carbon monoxide with steam into carbon dioxide and hydrogen by the prior art practice of using the conventional multi-layer catalysts, the reaction between the two components starts at a temperature of about 400° C. and, depending on the percentage of carbon monoxide in the gas to be converted, attains a temperature as high as 600° C. in the first catalyst layer. Before contacting the next catalyst layer, the gas is cooled down again to 400°–440° C. This intermediate cooling has the benefit that the converted gas generally leaves the reaction chamber at a temperature lying between about 400° and 440° C.

The transfer of the heat content of the converted or partially converted gas, hereinafter briefly termed contact gas, to the fresh gas to be converted is accomplished by means of heat exchangers and in a so-called cooler-saturator system, in which the contact gas gives up part of its heat and steam content immediately to water in a shower cooler, the water then being further heated up by the contact gas in a tubular cooler. The fresh gas is then showered in a shower saturator with the hot circulating water, thus being heated up and laden with steam.

Figure 1:
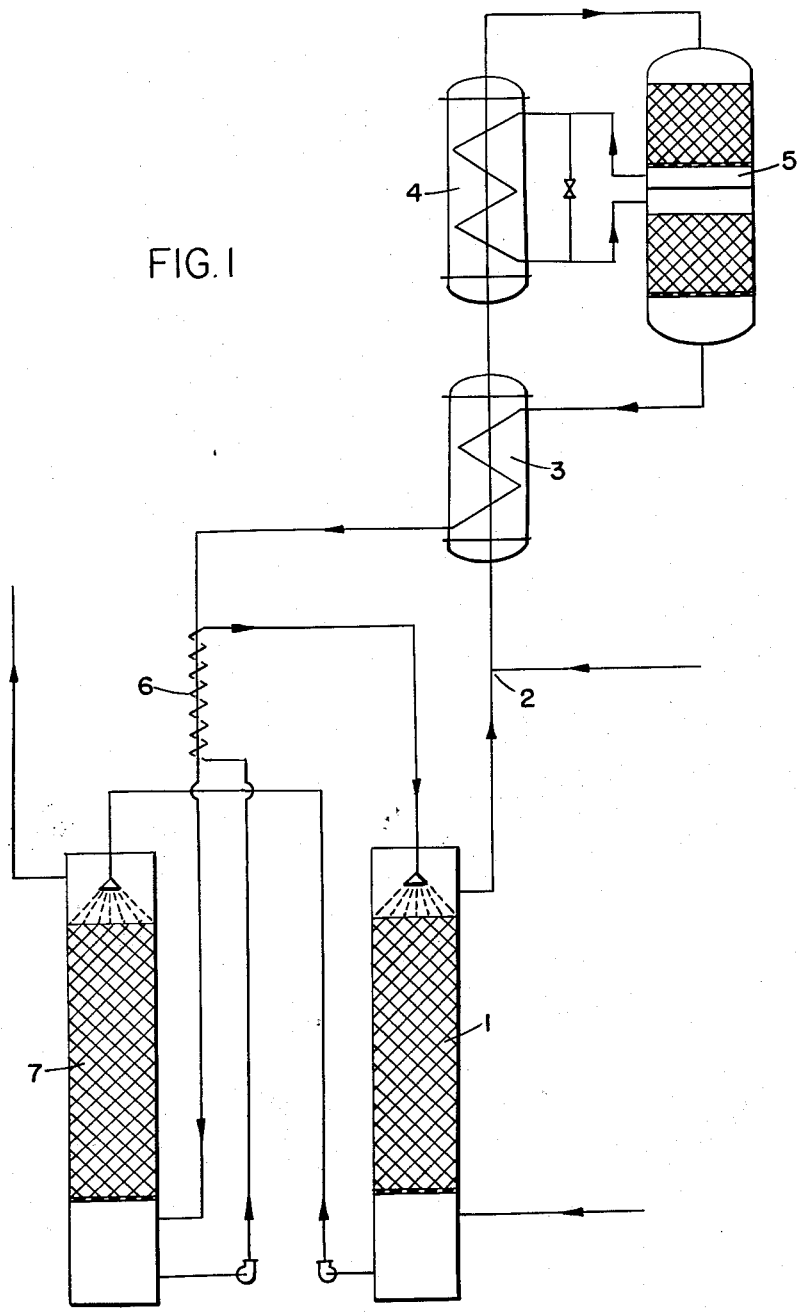

Figure 1 diagrammatically illustrates a conversion plant of the aforesaid type, which is operated in the following manner:

The fresh gas is saturated in a saturator 1. Additional steam is supplied at 2. In the preliminary heat exchanger 3 heat exchange takes place between the fresh gas and the contact gas and in the intermediate heat exchanger 4 the heat of reaction or part thereof is given up to the fresh gas, which then passes to the upper catalyst bed of the reaction chamber 5 at a temperature of about 400° C. Reaction chamber 5 also contains a second lower catalyst bed.

The contact gas leaving the reaction chamber gives up part of its heat to the fresh gas in the preliminary heat exchanger 3, thence passes to tubular cooler 6 in which it is cooled down almost to its dew point by the circulating water and finally arrives in the shower cooler 7, in which it is showered with the circulating water. The contact gas is then passed to further processing over a final cooler which has not been shown.

The circulating water flowing from the shower cooler 7 is pumped through tubular cooler 6 to the saturator 1 and the water flowing from the saturator 1 is pumped to the cooler 7.

The pressure of the additional steam supplied at 2 must be higher than the pressure prevailing in the conversion system.

To ensure economy in the conversion it is of prime importance to furnish the heat which is additionally required at the lowest possible temperature level, for example as steam of a pressure that is lower than the pressure at which the conversion is conducted or as waste heat available at various points of synthesis plants.

The present invention provides a novel and efficient method of supplying the heat additionally needed in the conversion to the circulating water of the cooler-saturator system. It also provides means for the practice of this new method of heat supply consisting in a heat exchanger, for example a tubular heat exchanger, which is placed in the water cycle between the shower cooler 7 and the cooler and heat exchanger 6 heated by the contact gas. The said heat exchanger is fed by heat from a separate source, for example steam or waste heat from other plants.

Figure 2:
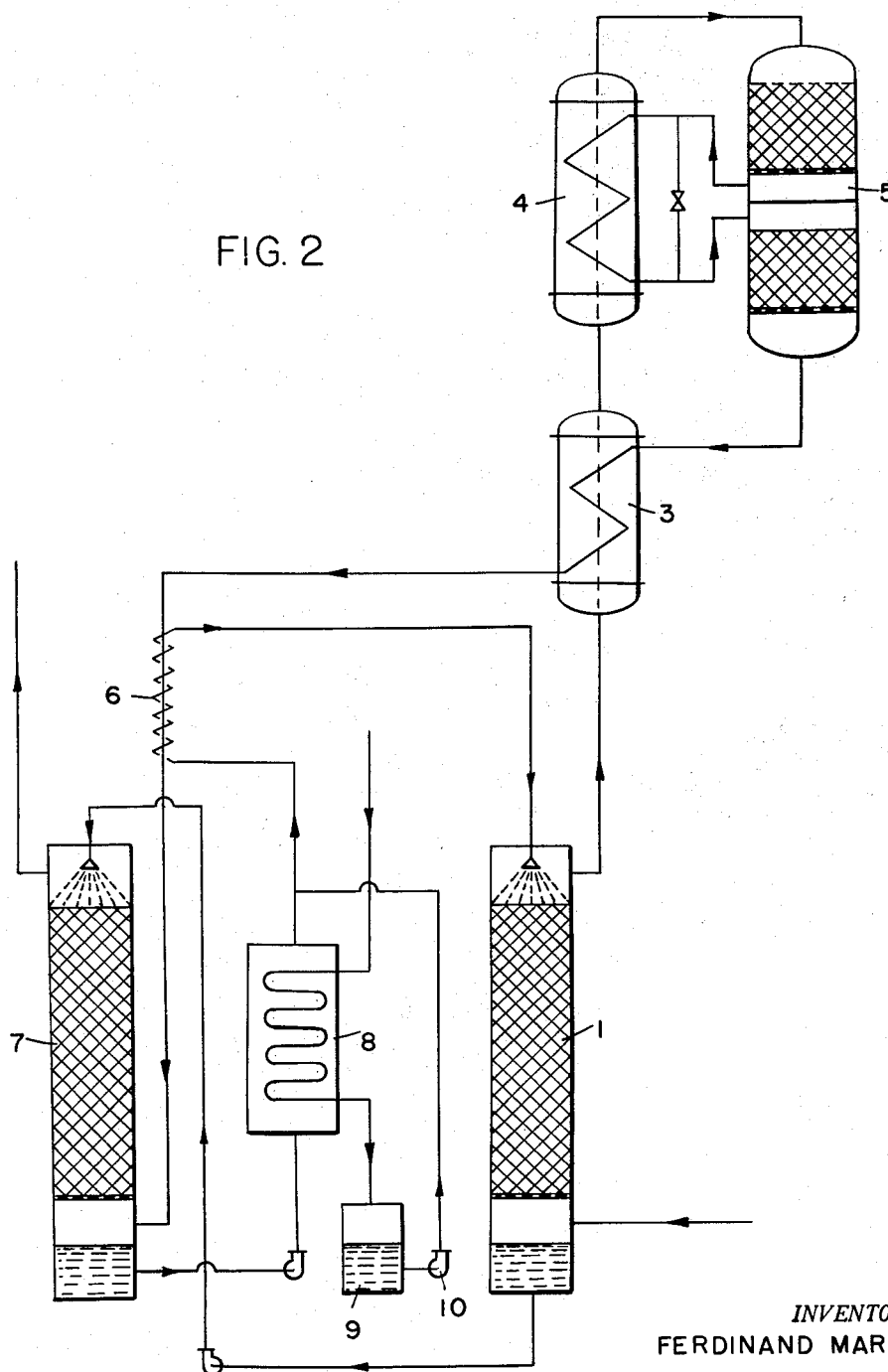

Fig. 2 of the accompanying drawing diagrammatically illustrates a plant for the practice of the new process according to our invention in which steam is used as the outside heat.

In the practice of our invention as illustrated in Fig. 2 the fresh gas is showered with water in a saturator 1, the water being so measured in temperature and rated in quantity that it absorbs the total amount of steam required for the conversion. From saturator 1 the fresh gas passes through preliminary heat exchanger 3 and intermediate heat exchanger 4 to the reaction chamber 5. As in Fig. 1 the contact gas after leaving the preliminary heat exchanger 3, passes through tubular cooler 6 to shower cooler 7 whence it passes to a final cooler (not shown) for further processing. The heat additionally needed is supplied by heating the circulating water flowing from the shower cooler 7 with steam in the tubular heat exchanger 8. The condensate formed in heat exchanger 8 is conveyed from container 9 to the water cycle by pump 10.

One embodiment of our invention will now be illustrated in detail by way of the following example which is given to establish the efficiency of the new process in practical use.

When the fresh gas passed to conversion is conducted under a pressure of 28 atmospheres, the water flowing from the shower cooler 7 has a temperature of 176° C. Let this quantity of water be 6.5 kilograms to each cubic metre (NTP) of fresh gas. The additional demand of steam for this conversion is 0.29 kilogram to each cubic metre (NTP) of fresh gas, given a heat content of the steam of 725 kilogram-calories to each kilogram. The circulating water is heated up by this steam to 200° C. The circulating water is further heated in the tubular cooler 6.

Appliances, as the steam-heated tubular heat exchanger 8 which functions as a water-heater, are common in thermal stations. They operate with temperature differences between the temperature of the heat-supplying saturated steam and the end temperature of the water to be heated ranging between 5° and 10° C. For example, at a temperature difference of 7° C., the heat-supplying saturated steam must have a temperature of 207° C. if the circulating water were to be heated to 200° C. As a result, steam of a pressure of 18.3 atmospheres can be used for the heat supply, whereas the conversion is practiced at a pressure of 28 atmospheres.

When the total demand of steam drops, there is also a reduction in the consumption of fresh steam as well as a drop in the temperature at which the water flows from the shower cooler 7 and the tubular heat exchanger 8. As a result, the pressure under which the heating steam must be kept will also be reduced.

The additional heat required for the conversion, instead of being furnished by steam, may also be furnished by waste heat by using it for heating the circulating water. According to a preferred embodiment of our invention the circulating water is passed from the conversion plant to the separate sources of heat, heated up and recycled to the conversion plant. Available heat sources are, for example, gas-producer plants, synthesis plants for the ammonia production, methanol production, and the production of other synthesis products, as for example higher alcohols or hydrocarbons from carbon monoxide and hydrogen or the destructive hydrogenation of mineral coal, tars and mineral oils or their fractions and the like for the production of high-quality hydrocarbon oils and the like.

In the example specified above 6.5 kilograms of the circulating water are needed to each cubic metre (NTP) of fresh gas for raising the temperature of the water to 200° C. in the tubular cooler 8, the proportionate pressure of the heating steam being 18.3 atmospheres. When a larger quantity of water would be used in the water cycle and hence the rise in temperature by the heating steam be diminished, even lower heating steam pressures could be done with. Owing to the temperature conditions that exist in the shower cooler and the saturator, however, only a limited quantity of water can be put in circulation so that it is not possible by the system illustrated in Fig. 2 to operate with markedly increased quantities of water.

Such working with larger quantities of circulating water, however, will be practicable when according to an alternative embodiment of our invention two water cycles are used.

Figure 3:
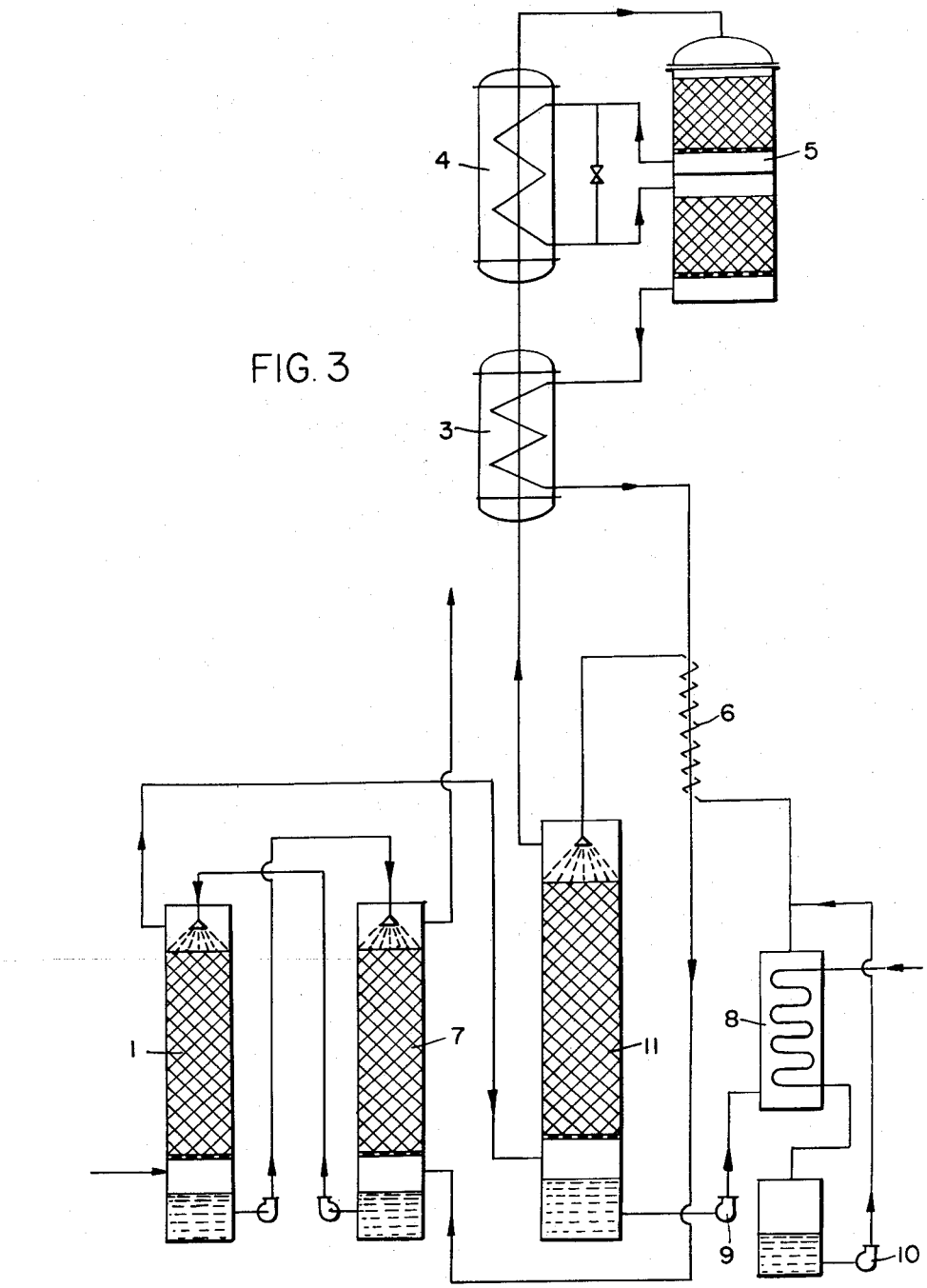

In the practice of this embodiment which is diagrammatically illustrated in Fig. 3 the fresh gas is presaturated in a saturator 1 then absorbs the whole of the steam needed for the conversion in a saturator 11 and passes to the reaction chamber 5 through preliminary heat exchanger 3 and intermediate heat exchanger 4. The contact gas is cooled in the intermediate heat exchanger 4 and the preliminary heat exchanger 3 by the fresh gas to be heated, then delivers part of its heat to the circulating water in the tubular heat exchanger 6 and thence passes to the shower cooler 7 at a temperature which is a little above its dew point.

There are now two water cycles available, a cold cycle and a hot cycle. In the cold cycle the water flowing from cooler 7 is pumped to saturator 1 and back again to cooler 7. In the hot cycle the water flowing from saturator 11 is first heated in the tubular heat exchanger 8 by additional heat drawn from a separate source (in the instant case steam is used by way of example), the condensate of the heating steam being pumped back into the water cycle from container 9 by means of pump 10. The circulating water of this second cycle is further heated in the tubular cooler 6 by the contact gas. Circulating in the hot water cycle is a larger quantity of water than in the cold cycle.

Under the conditions adopted in the foregoing example the quantity of water put in circulation may be such, for example, that 12 kilograms of water flow to the saturator 11 to each cubic metre (NTP) of fresh gas. The quantity of water which has been diminished by the amount of steam absorbed by the fresh gas leaves the saturator 11 at a temperature of 177° C. After the addition of fresh condensate having a temperature of 140° C. the water has a temperature of 176° C. By heating it with 0.29 kilogram of steam, its temperature rises to 190° C. The heating steam must thus have a temperature of 197° C. in the saturated state and accordingly have a pressure of 15 atmospheres.

If the same conversion be conducted at a pressure of 12 to 13 atmospheres, the heating steam should have a pressure of 6 to 7 atmospheres.

The industrial importance of the process according to our invention will be evident from the following example taken from factory practice.

When conducting the pressure conversion in connection with a synthesis gas plant at a pressure of 28 atmospheres with the heating steam system available being operated at a pressure of 31 amospheres, the steam used in the conversion need only be under a pressure of 15 atmospheres, instead of 31 atmospheres, when the process according to our invention is used. As a result, the steam may be utilized in the factory power station, prior to being carried to the conversion process, for the generation of current by the operation of steam turbines and thus its tension may be released from 31 atmospheres down to 15 atmospheres as required in the conversion practice.

Fig. 4 diagrammatically illustrates the heating of the water cycle by the waste heat from a shaft furnace of the ammonia synthesis. The temperature of the ammonia reaction in the shaft furnace 13 is regulated by the introduction of cold gas. The gas carried to synthesis enters the ammonia furnace at 12, flows round the tubes of the heat exchangers 14 and 15 interconnected by the collecting chamber 16, passes through the catalyst layers 17, 18 and 19 back to the heat exchangers, and leaves through the outlet pipe 20.

We have now found that the waste heat from pressure syntheses can be utilized in part for heating the reaction components carried to synthesis and in part for heating the circulating water of the conversion reaction. For this latter purpose the gas arriving from the heat exchanger 14 may be contacted with the circulating water of the conversion for heat exchange or part of the current of the reaction components coming from the synthesis may be branched off before or after the heat exchanger 15 but before the heat exchanger 14 and used for heating the circulating water.

This partial current can be branched off since the amount of the gas carried to synthesis is smaller by reason of the subsequent supply of cold gas in the reaction chamber than the amount of the gas discharged therefrom. In the practice of our invention a partial current of the gas is derived from the collecting chamber 16 and passed from the furnace through outlet pipe 21 to the cooler and heat exchanger 22, in which it delivers part of its sensible heat to the circulating water of the conversion indicated by the shower saturator 11 and the heat exchanger 6.

The function carried out by the heat exchanger 8 in Fig. 3 and Fig. 4 is carried out by apparatus 22 in Fig. 4 which functions as a cooler in the pressure synthesis and as a heat exchanger in the conversion.

The gas leaving the shaft furnace at 21 is cooled together with the gas leaving at 20 in the cooler and heat exchanger 23. The partial current of gas is controlled by a valve 24 placed in the path of the partial current of the reaction gases behind the cooler and heat exchanger 22.

In the example according to Fig. 3 the circulating water of the hot conversion stage is heated up in cooler 22 from 176° to 190° C., and the partial current of ammonia gas which arrives in the cooler at a temperature of, for example, 300° C. is simultaneously cooled down to 190° C.

The reaction gases leaving the heat exchanger 14 of the ammonia furnace, when no such partial current has been branched off therefrom, have a temperature of between 160° and 200° C. and may be directly used for heating the circulating water of the conversion when the conversion needs a small amount of steam or proceeds at a low working pressure.

We claim:

1. In a catalytic method for converting carbon monoxide and steam into carbon dioxide and hydrogen wherein circulating water is heated in indirect heat exchange by hot reaction gas and fresh carbon monoxide-containing gas is contacted with the resulting hot circulating water prior to the conversion, the improvement which comprises supplying heat required for the said conversion additionally to that resulting therefrom to the said circulating water by heating the latter in indirect heat exchange with steam during its cycle subsequent to its said contact with said fresh gas and prior to the said heatinug thereof by said reaction gas, said heating steam being under a pressure below that of the said conversion.

2. In a catalytic method for converting carbon monoxide and steam into carbon dioxide and hydrogen under superatmospheric pressure wherein circulating water is heated in indirect heat exchange by hot reaction gas and fresh carbon monoxide-containing gas is contacted with the resulting hot circulating water prior to the conversion, the improvement which comprises supplying heat required for the said conversion additionally to that resulting therefrom to the said circulating water by heating the latter in indirect heat exchange with steam under a pressure below that of the said conversion, and adding steam condensate resulting from said heating with steam to said circulating water, each of said heating with steam and said addition of steam condensate taking place during the cycle of the circulating water subsequent to its said contact with said fresh gas and prior to the said heating thereof by said reaction gas.

3. In a catalytic method for converting carbon monoxide and steam into carbon dioxide and hydrogen under superatmospheric pressure wherein circulating water is heated by hot reaction gas and fresh carbon monoxide-containing gas is contacted with the resulting hot circulating water prior to the conversion, the steps which comprise providing successively in the cycle of the said circulating water a first gas contact zone, a first heat exchange zone, a second heat exchange zone and a second gas contact zone, passing hot reaction gas successively through said second heat exchange zone in indirect heat exchange relationship to said circulating water and through said first gas contact zone in contact with the circulating water, supplying steam under a pressure below that of the said conversion to said first heat exchange zone in indirect heat exchange relationship to said circulating water, adding condensate from said steam supplied to said first heat exchange zone to said circulating water between said first and second heat exchange zones, and passing the said fresh gas through said second gas contact zone in contact with said circulating water.

4. In a catalytic method for converting carbon monoxide and steam into carbon dioxide and hydrogen under superatmospheric pressure wherein circulating water is heated by hot reaction gas and fresh carbon monoxide-containing gas is contacted with the resulting hot circulating water prior to the conversion, the steps which comprise providing a hot circulating water cycle and a cold circulating water cycle, the said cold cycle including therein a first gas contact zone and a second gas contact zone, the said hot cycle including succesisvely therein a first heat exchange zone, a second heat exchange zone and a third gas contact zone; passing hot reaction gas successively through said second heat exchange zone in indirect heat exchange relationship to the said hot cycle circulating water and through said first gas contact zone in contact with the said cold cycle circulating water; supplying steam under a pressure below that of the said conversion to said first heat exchange zone in indirect heat exchange relationship to said hot cycle circulating water; adding condensate from said steam supplied to said first heat exchange zone to said hot cycle circulating water between said first and second heat exchange zones; and passing the said fresh gas successively through said second gas contact zone in contact with said cold cycle circulating water and through said third gas contact zone in contact with said hot cycle of circulating water.

5. In a catalytic method for converting carbon monoxide and steam into carbon dioxide and hydrogen under superatmospheric pressure wherein circulating water is heated by hot reaction gas and fresh carbon monoxide-containing gas is contacted with the resulting hot circulating water prior to the conversion, the steps which comprise providing successively in the cycle of said circulating water a first heat exchange zone, a second heat exchange zone and a gas contact zone; passing the gas resulting from the said conversion through said second heat exchange zone in indirect heat exchange relationship to said circulating water to cool the conversion gas to a temperature approaching its dew point; supplying steam under a pressure below that of the said conversion to said first heat exchange zone in indirect heat exchange relationship to said circulating water; adding condensate from said steam supplied to said first heat exchange zone to said circulating water between said first and second heat exchange zones; passing the said fresh gas through said gas contact zone in contact with said circulating water; subsequently transferring in indirect heat exchange sufficient heat from reaction gas to said fresh gas to bring the latter to reaction temperature, the heat transfer taking place at a point in the course of the reaction gas prior to said passage of conversion gas through said second heat exchange zone; contacting said conversion gas with water subsequent to its said passage through said second heat exchange zone to remove substantially the balance of the available heat from the gas; and transferring the heat removed in the latter contacting to said fresh gas by gas-water contact prior to discharge of the fresh gas from said gas contact zone; whereby the heat resulting from said conversion is recovered and reused therein, said steam supplied to said first heat exchange zone providing additional heat required for said conversion.

References Cited in the file of this patent

UNITED STATES PATENTS

| | | |
|---|---|---|
| 989,955 | Ellenberger | Apr. 18, 1911 |
| 1,614,072 | Kniskern | Jan. 11, 1927 |
| 1,703,747 | Patart | Feb. 26, 1929 |
| 1,756,934 | Beekley | May 6, 1930 |
| 2,338,402 | Brandt | Jan. 4, 1944 |

FOREIGN PATENTS

| | | |
|---|---|---|
| 417,829 | Great Britain | Oct. 12, 1934 |
| 586,758 | Great Britain | Mar. 31, 1947 |